Figure 1:
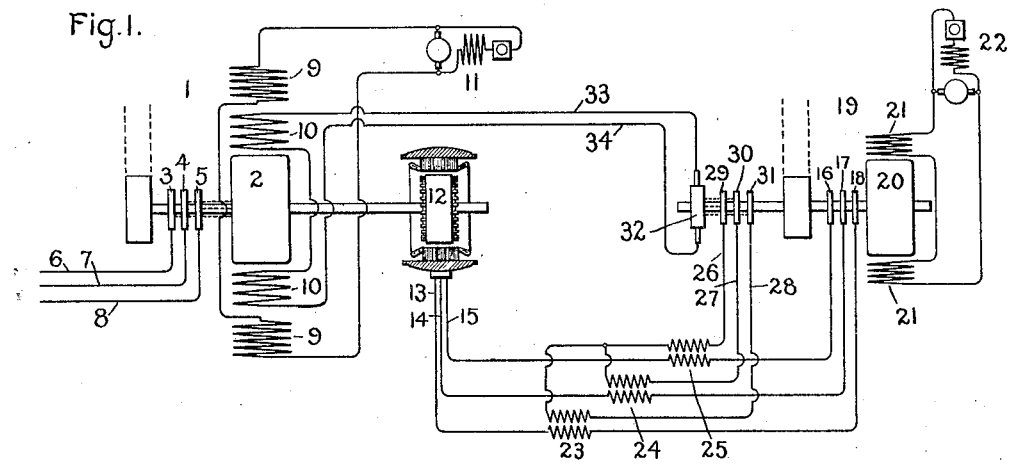

No. 680,236. Patented Aug. 13, 1901.
H. EDWARDS.
REGULATION OF DYNAMO ELECTRIC MACHINES.
(Application filed May 17, 1901.)
(No Model.)

Witnesses
John Ellis Glenn.
Benjamin B. Hull.

Inventor
Harold Edwards.
by Albert G. Davis
Atty.

UNITED STATES PATENT OFFICE.

HAROLD EDWARDS, OF SCHENECTADY, NEW YORK, ASSIGNOR TO GENERAL ELECTRIC COMPANY, OF NEW YORK.

REGULATION OF DYNAMO-ELECTRIC MACHINES.

SPECIFICATION forming part of Letters Patent No. 680,236, dated August 13, 1901.

Application filed May 17, 1901. Serial No. 60,659. (No model.)

*To all whom it may concern:*

Be it known that I, HAROLD EDWARDS, a citizen of the United States, residing at Schenectady, in the county of Schenectady, State of New York, have invented certain new and useful Improvements in the Regulation of Dynamo-Electric Machines, (Case No. 1,687,) of which the following is a specification.

My present invention relates to certain improvements in regulating means for dynamo-electric machines, and is designed more especially with a view to overcoming or compensating for the objectionable effects due to variation in speed of the driving power.

In carrying my invention into effect I make use of a source of constant speed coöperatively related to the machine to be regulated in such a way as to produce a current which varies in response to the fluctuations in speed upward or downward of the main or regulated machine. The current or currents thus generated are caused to act either directly or indirectly to control the regulation of the main machine in such a manner as to compensate for the effects of the speed fluctuation referred to.

My invention may be embodied in a great variety of different mechanisms, among which I have hereinafter described in connection with the accompanying drawings a few of the more desirable forms which embody the principles of my invention. The several arrangements thus described each possesses the common characteristic of two operatively-related dynamo-electric machines, one of which is driven at a constant speed and the other at a speed which may be variable. One of these machines is an induction-motor and the other a source of alternating current connected to the exciting-winding of said motor. When the two machines are running in synchronism with each other, or, in other words, when the main machine to be regulated is at normal speed, a comparatively small current will flow to the exciting-winding of the induction-motor. When, however, the speed of the machine to be regulated varies from normal, the induction-motor acts either as a motor to consume current or as an induction-generator to produce current. The flow of current thus produced, which flow varies in magnitude according to the extent of departure of the speed of the main machine from normal, is utilized to regulate the field of said main machine to compensate for the effects of the variations of speed noted.

I do not wish to be understood as limiting myself to the exact arrangement set forth in general terms above or hereinafter described in detail in connection with the accompanying drawings, but, on the contrary, desire the scope of my invention to be determined in accordance with the claims appended hereto, in which I have particularly pointed out what I believe to be the features of novelty.

Figure 2:
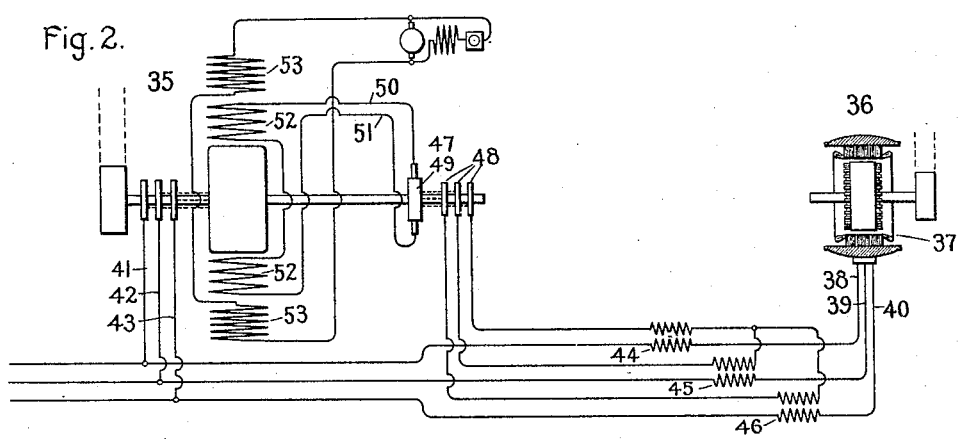

In the drawings which accompany this specification, Figure 1 represents in diagram one embodiment of my invention; Fig. 2, a modified form of the same, and Fig. 3 still another modified form.

In Fig. 1 the machine to be regulated, which, for example, may be a three-phase dynamo-electric machine, is indicated at 1 and consists, as shown, of an armature 2, having thereon a three-phase winding connected in a well-known manner to three collector-rings 3 4 5, from which extend three-phase mains 6, 7, and 8. Since the three-phase winding on the armature 2 may be of any well-known form, and especially since it constitutes no novel feature of the present invention, no attempt has been made to illustrate the same in detail. The field-winding in this case is shown as stationary and as consisting of two sets of coils, one set (indicated at 9) being the main exciting-winding, and another set (indicated at 10) being a regulating-winding. Although I have mentioned this main machine as consisting of a stationary field and rotating armature, it will of course be understood that the field may revolve and the armature remain stationary, as is indeed the more common practice at the present time. The main exciting-winding 9 receives its current from any suitable source— as, for example, the exciter 11. The regulating-winding 10 receives its current in a manner about to be described.

Mounted upon the shaft carrying the armature 2 or upon some shaft revolved synchronously therewith is the armature or moving member 12 of an induction-motor.

The inducing member of the motor, which in this case is shown as stationary, has its exciting-winding connected through the terminals 13, 14, and 15 with a set of collector-rings 16, 17, and 18 of a small three-phase alternating-current generator 19, driven at constant speed by any suitable means—as, for example, a separate steam-engine, waterwheel, or the like. The armature of this machine, to the winding of which the collector-rings 16, 17, and 18 are connected, is indicated at 20 and its field-winding at 21. This field-winding may be excited from a separate exciter 22, as indicated, or, if desired, from the exciter 11 of the main alternator 2.

The leads 13, 14, and 15, extending between the induction-motor and the small alternator 19, include the primaries 23, 24, and 25 of three transformers, the secondary windings of which have one end of each connected together and the others joined to a set of leads 26, 27, and 28, which make connection with a rectifying device, consisting in this case of three collector rings 29, 30, and 31, suitably connected to corresponding segments of a rectifying-commutator, (indicated at 32.) Suitable brushes bear upon this commutator and collect the rectified current, which is transmitted through the leads 33 34 to the regulating-winding 10, above referred to.

The number of poles of the induction-motor whose armature is indicated at 12 and the number of poles of the small alternator 19 are so designed with reference to each other that when the main machine 1 is running at normal speed the induction-motor armature will be running exactly in synchronism with the rotating field of its inducing member. Under these circumstances a comparatively small current only will pass through the leads 13 14 15. If, however, the main machine 1 drops in speed, the armature 12 of the induction-motor will drop below synchronism, whereupon current will flow through the small alternator 19 to the induction-motor, the amount of this current depending upon the extent of deviation of the main machine 1 from its normal speed. Electromotive forces of corresponding value are produced in the secondary windings of the series transformers, which are connected in the leads 13, 14, and 15, and these electromotive forces produce alternating currents, which are rectified by the rectifying-commutator 32 and supplied to the regulating-winding 10, the direction of current in this winding being such as to increase the strength of the field and so compensate for the drop in voltage due to decrease in speed.

If instead of a drop in speed of the main machine there occurs an increase in speed above normal, due perhaps to abnormally light load, the induction-motor is driven above synchronism, as will readily be understood, and instead of acting as a motor operates as an induction-generator, current in the leads 13, 14, and 15 thus reversing in direction and flowing from the induction-machine to the small alternator 19. The series transformers respond accordingly and with the coöperation of the rectifying-commutator produce in the leads 33 and 34 a direct current of reverse direction and of a value depending upon the excess of speed in the main machine above the normal. The current in the regulating-winding 10 under these circumstances cuts down the field of the main machine and so compensates for the effect of the excess speed.

Fig. 2 of the drawings shows an arrangement which in a certain sense may be considered a reversal of that shown in Fig. 1. In this case the induction-motor, instead of being driven synchronously with the main machine, as in Fig. 1, takes the place of the small alternator 19 in this figure and is driven at constant speed. Since the alternator 19, if put in the place of the induction-machine 12 to complete the reversal, would be driven in synchronism with the main machine and would produce alternating current of the same frequency or a frequency proportional to that of the main machine, there no longer would exist a necessity for this small alternator, which may therefore be omitted, the main machine itself furnishing the alternating current caused to flow to the induction-machine. The resulting arrangement which is shown in Fig. 2 consists principally therefore of the main alternator 35, the component parts of which may be similar in all respects to the machine 1, described more or less in detail in connection with Fig. 1. The induction-machine or induction-motor coöperating with the main machine is indicated at 36 and has an inducing member 37, provided with a winding the terminals of which 38, 39, and 40 are connected through leads correspondingly designated to the leads 41, 42, and 43 of the main alternator or machine 35. The induction-motor leads 38 39 40 include the primaries of series transformers 44 45 46. The secondaries of these series transformers give rise to electromotive forces which vary in accordance with the flow of current through the primaries, these electromotive forces being impressed upon a rectifying commutator 47, consisting of a set of collector-rings 48 and a commutator proper, 49, mounted either upon the shaft of the main machine 35 or upon some other shaft revolved synchronously therewith in any suitable and well-known manner. The electromotive forces impressed upon the rectifying-commutator produce an alternating current which is, by means of the commutator, rectified and then transmitted through leads 50 and 51 to the regulating-winding 52 of the main alternator 35. The main exciting-winding of the alternator is indicated at 53 and corresponds in function to the winding designated as 9 in Fig. 1.

The mode of operation of the arrangement shown in Fig. 2 is substantially the same as that shown in connection with Fig. 1. Upon an increase in speed of the main machine from normal the induction-motor 36 takes current from the main machine through the leads 38 39 40, while upon a decrease in speed from normal the induction-motor supplies current, which then flows in an opposite direction through these leads. In both of these cases the series transformers 44 45 46, acting in conjunction with the rectifying-commutator 47, supply a regulating-current to the winding 52 of such a nature as to compensate for the effects of the fluctuations of speed referred to.

Figure 3:
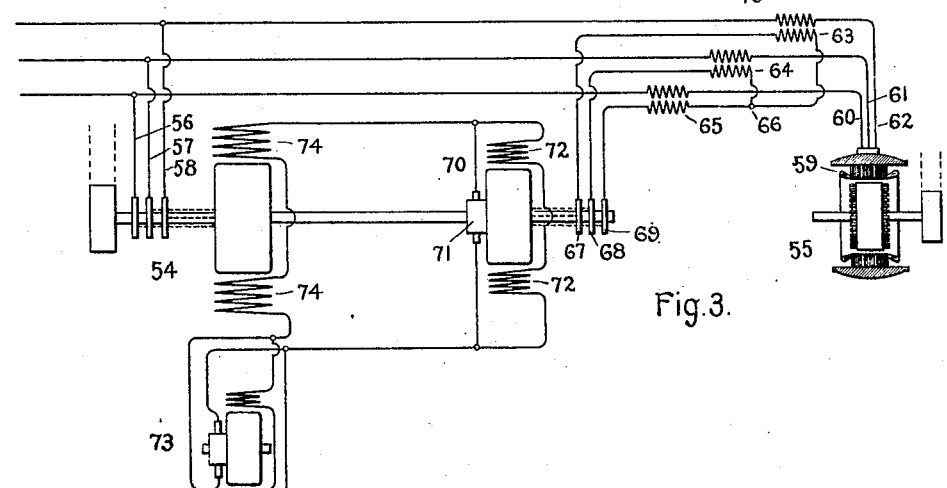

Fig. 3 shows an arrangement which differs from both of the preceding in that the alternating current which causes the regulation of the main machine, instead of being rectified by a rectifying-commutator, is supplied to the armature of a positively-driven auxiliary exciter, the voltage of which is varied in response to variation of armature reaction caused by the alternating current flowing in the leads connected thereto.

Referring to Fig. 3, the main machine or alternator to be regulated is indicated at 54 and the induction-motor which is driven at constant speed at 55. The alternator leads 56, 57, and 58 are connected to the inducing member 59 of the induction-motor through the leads 60, 61, and 62, as shown. In series with the last-mentioned leads are connected, respectively, the primary windings of three series transformers. The secondary windings, which are in this case indicated at 63, 64, and 65, have one terminal of each joined to a common point, as 66. The remaining terminals of these secondaries are connected to a set of collector-rings 67, 68, and 69, which are joined in three-phase relation to the armature-winding of a regulating-exciter 70, the construction of which is practically identical with that of any direct current-exciter, the only difference being that its armature-winding has taps connected in multiphase relation thereto and joined to a set of collector-rings, as shown. The commutator 71 of this exciter supplies current to the field-winding 72 of the exciter and is connected in series with the main exciter 73 of the main alternator 54. Both exciters 70 and 73 therefore coöperate to supply current to the field-winding 74 of the main machine 54. During operation of the arrangement described deviations in speed of the main machine 54 from normal cause electromotive forces to be set up in the secondary winding 63 64 65 in a manner already described. These electromotive forces, through the instrumentality of the collector-rings 67, 68, and 69, are impressed upon the armature-winding of the exciter 70 and act to modify the flow of current in the conductors thereof, thereby varying the armature reaction, and consequently the voltage upon the commutator 71, which voltage is either added to or subtracted from that in the exciter-circuit as may be necessary to secure proper regulation of the main machine 54. The particular manner in which the voltage of the exciter 70 is varied by reason of its connection with the secondaries of the series transformers mentioned does not constitute a part of my present invention, the same being fully set forth and claimed in a patent to E. W. Rice, Jr., No. 595,412, dated December 14, 1897.

What I claim as new, and desire to secure by Letters Patent of the United States, is—

1. The combination of a main machine, an auxiliary regulating-machine driven at constant speed, and means responsive to variations in relative motion of said machines for producing a regulating-current, and means for controlling by said current the field strength of said main machine.

2. A combination of a main machine, an auxiliary machine electrically connected thereto and driven at speed independent of that of the main machine, and means for causing a regulating-current to flow between said machines in response to a variation in speed of one of said machines relatively to the other.

3. The combination of a main machine, an auxiliary machine electrically connected thereto and driven at constant speed, and means for regulating the main machine through the instrumentality of current flowing between said machines.

4. The combination with a main machine, of an induction-machine driven at constant speed and electrically connected with a circuit or circuits of said main machine, and means controlled by current flowing in the circuits of said induction-machine for regulating said main machine.

5. The combination with an alternating-current generator and an induction-machine, electrical connections between said machines, and means responsive to variations in the relative speed of said machines for producing a direct current of a value corresponding to the magnitude of said relative speed variations.

6. A combination with a main alternator, an induction-machine driven at constant speed, circuits connecting said machines, series transformers included in said circuits, a rectifying-commutator connected to secondary windings of said transformers, and a winding on said main machine connected to said rectifying-commutator.

7. The combination of a machine of variable speed, a machine of constant speed, means for causing current to flow between said machines in accordance with the variation of speed of said machines relatively to each other, and means for regulating the field of the variable-speed machine through the instrumentality of said currents.

In witness whereof I have hereunto set my hand this 15th day of May, 1901.

HAROLD EDWARDS.

Witnesses:
 BENJAMIN B. HULL,
 MARGARET E. WOOLLEY.